United States Patent [19]

Imazeki et al.

[11] Patent Number: 4,467,432
[45] Date of Patent: Aug. 21, 1984

[54] TRACER CONTROL SYSTEM

[75] Inventors: Ryoji Imazeki; Etsuo Yamazaki, both of Hachioji, Japan

[73] Assignee: Fujitsu Fanuc Limited, Tokyo, Japan

[21] Appl. No.: 380,745

[22] PCT Filed: Sep. 4, 1981

[86] PCT No.: PCT/JP81/00220

§ 371 Date: May 10, 1982

§ 102(e) Date: May 10, 1982

[87] PCT Pub. No.: WO82/00966

PCT Pub. Date: Apr. 1, 1982

[30] Foreign Application Priority Data

Sep. 12, 1980 [JP] Japan .................. 55-126780

[51] Int. Cl.$^3$ .................. G05B 19/36; G06F 15/46
[52] U.S. Cl. .................. 364/474; 364/168; 364/170; 364/174; 364/520; 318/571; 318/578
[58] Field of Search .............. 364/168, 170, 171, 174, 364/474, 520, 551; 318/570, 571, 578, 162; 409/67, 79, 80, 98, 90, 126, 127, 130

[56] References Cited

U.S. PATENT DOCUMENTS 4,044,289 8/1977 Wenzel et al. .................. 318/571
4,224,670 9/1980 Yamazaki .................. 364/474
4,334,272 6/1982 Imazeki et al. .................. 364/474
4,370,722 1/1983 Imazeki et al. .................. 364/520 X
4,386,408 5/1983 Imazeki et al. .................. 364/474
4,394,608 7/1983 Tryber et al. .................. 364/474

Primary Examiner—Joseph F. Ruggiero
Assistant Examiner—Allen MacDonald
Attorney, Agent, or Firm—Staas & Halsey

[57] ABSTRACT

The direction of pick feed is determined by a feed-direction signal produced based on the result of decision by a phase decision circuit and the direction of pick feed inputted from an input unit, and the pick feed is effected by a contour trace. In the case of tracing a hemispherical model, the pick feed can be achieved in a plane parallel to the X-Y plane. The feed-direction signal indicates whether the direction of tangential velocity is to be +90° or −90° with respect to the normal direction. A velocity arithmetic circuit inverts the polarity of its output, a tangential-direction velocity signal, depending on the binary value of the feed-direction signal. Motors are driven by the outputs from amplifiers selected by a gate circuit, by which, in the case of tracing the hemispherical model, the pick feed plane is made to correspond to that in the case of a contour trace, wherein the pick feed can be effected in a plane parallel to the X-Y plane.

2 Claims, 5 Drawing Figures

TRACER CONTROL SYSTEM

BACKGROUND OF THE INVENTION

The present invention relates to a tracer control system in which pick feed planes can be made uniform in the case of tracing a hemispherical model.

In the case of tracing a model MDL 1 of a three-dimensional configuration such as shown in FIG. 1, for example, by a system which performs tracer control through calculating a trace velocity and a trace direction based on signals available from a tracer head tracing the model surface, the tracing usually takes place following a route a-b-c-d-e-. That is, the tracer head moves from the position a to the trace return position b in the Y-Z plane, a pick feed is carried out to cause the tracer head to move in the X-axis direction at the trace return position b, thence the tracer head moves to the position c in the X-Z plane, and thence moves from the position c to the trace return position d in the X-Z plane again. In this way, the feed axis is turned through 90° between the pick feed and the tracing operation.

In the case of tracing the model MDL 1 shown in FIG. 1, as described above, the pick feed can be effected in the same plane, only by turning the feed axis through 90°. In the case of tracing a hemispherical model MDL 2 such as shown in FIG. 2, for example, if the abovesaid system is applied, the pick feed cannot be effected in a plane parallel to the X-Y plane as in FIG. 1. The solution of this problem is now being demanded.

SUMMARY OF THE INVENTION

The present invention meets such a demand as mentioned above, and has for its object to effect the pick feed in the same plane in the case of tracing a model with a surface portion that is generally hemispherical.

According to the present invention, the direction of pick feed is determined by a feed direction signal produced on the basis of the result of a decision by a phase decision circuit and the direction of pick feed available from an input unit, and the pick feed performed by a contour trace. Even in the case of tracing a hemispherical model, the pick feed can be effected in a place parallel the X-Y plane.

DETAILED DESCRIPTION OF THE PREFERRED EMBODIMENTS

Figure 1:
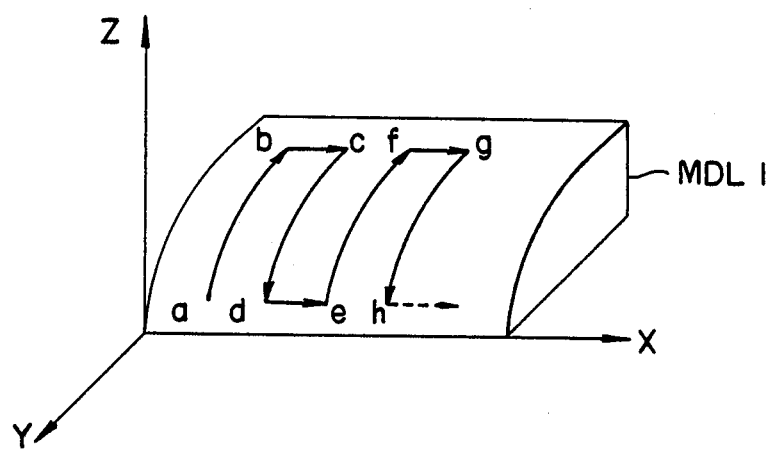
FIGS. 1 and 2 are explanatory of prior art tracing examples.
Figure 2:
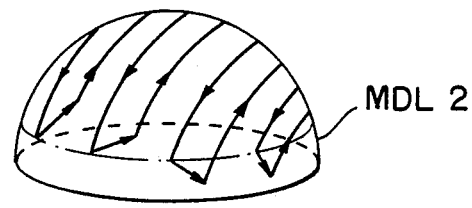
Figure 3:
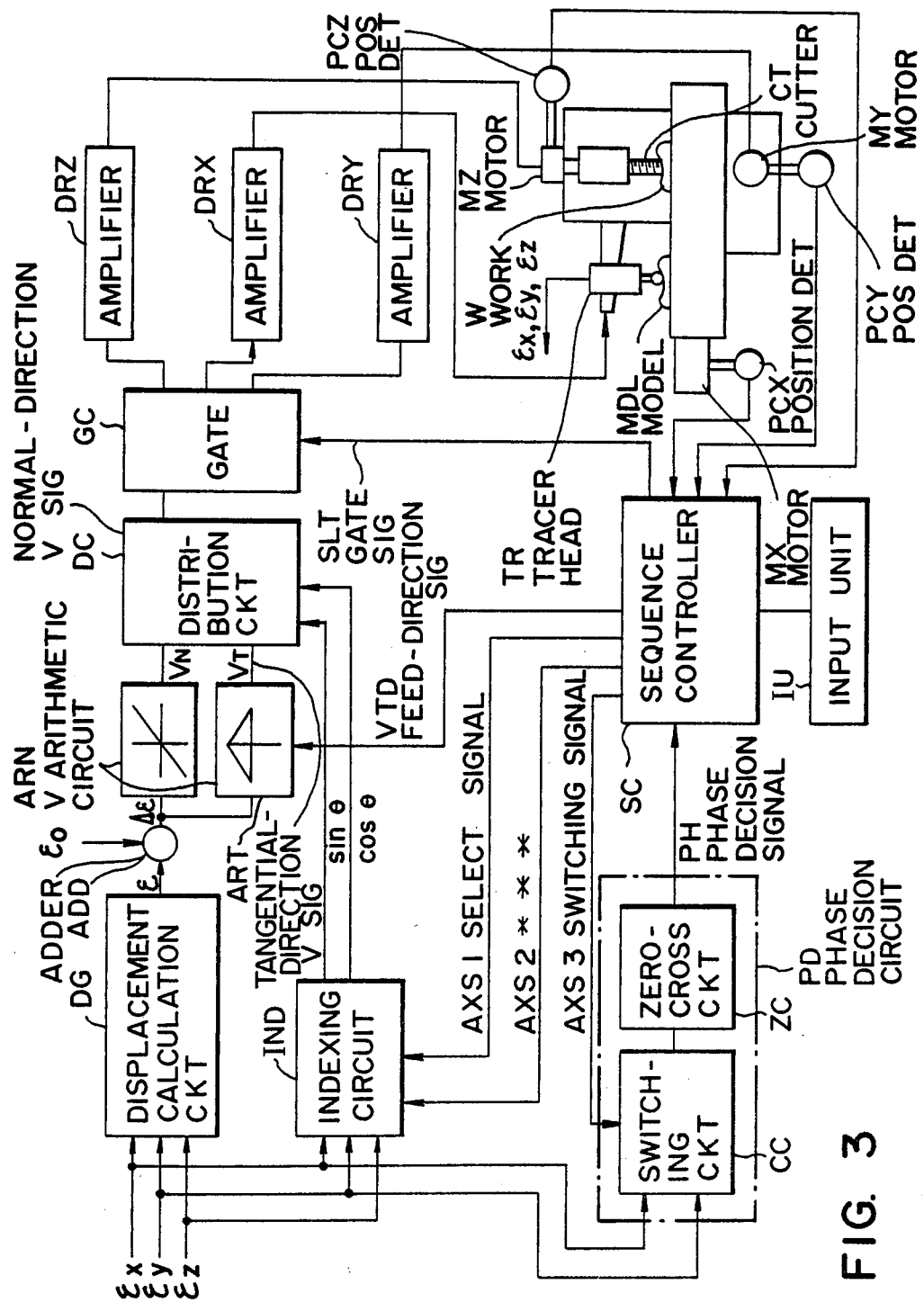
FIG. 3 is a block diagram illustrating an embodiment of the present invention.

FIG. 3 is a block diagram illustrating an embodiment of the present invention. Reference character DG indicates a displacement calculation circuit, IND an indexing circuit, ARN and ART velocity arithmetic circuits, DC a distribution circuit, GC a gate circuit, PD a phase decision circuit composed of a switching circuit CC and a zero-cross circuit ZC, SC a sequence controller, IU an input unit, DRX, DRY and DRZ amplifiers, MX, MY and MZ motors, PCX, PCY and PCZ position detectors, ADD an adder, MDL a model, W a work, TR a tracer head, CT a cutter, and ST a stylus.

Figure 4A:
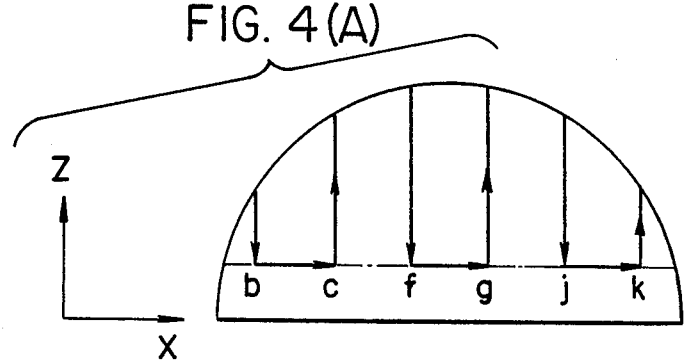
FIGS. 4(A) and 4(B) are explanatory of the operation of the embodiment shown in FIG. 3.
Figure 4B:
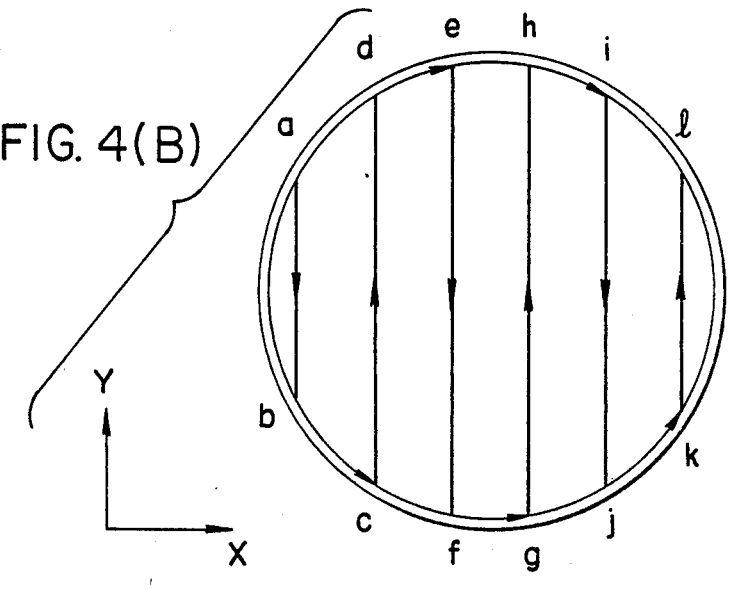

FIGS. 4(A) and 4(B) show routes in the case of tracing a hemispherical model according to this embodiment, FIG. 4(A) being a front view and 4(B) a top plan view. As will be seen from FIGS. 4(A) and 4(B), according to this embodiment, the tracer head (actually the end of the stylus ST as shown in FIG. 3) moves from the position a to the trace return position b in a plane parallel to the Y-Z plane, the pick feed takes place at the trace return position b, thence the tracer head moves to the position c in a plane parallel to the X-Y plane, and thence moves from the position c to the trace return position d in a plane parallel to the Y-Z plane again, after which the pick feed is again effected in a plane parallel to the X-Y plane. Similarly, the tracing and pick feed portions should occur in planes parallel to the Y-Z and X-Y planes, respectively.

Based on displacement signals $\epsilon_X$, $\epsilon_Y$ and $\epsilon_Z$ from the tracer head TR, the displacement calculation circuit DG yields a composite displacement signal $$\epsilon = \sqrt{\epsilon_X^2 + \epsilon_Y^2 + \epsilon_Z^2},$$

which is applied to the adder ADD. The adder ADD obtains a difference $\Delta\epsilon$ between the composite displacement signal $\epsilon$ and a reference displacement signal $\epsilon_0$, which difference is provided to the velocity arithmetic circuits ARN and ART. The velocity arithmetic circuit ART produces a normal-direction velocity signal $V_N$ base on the difference $\Delta\epsilon$, whereas the velocity arithmetic circuit ART produces a tangential-direction velocity signal $V_T$ based on the difference $\Delta\epsilon$ and a feed-direction signal VTD fed from the sequence controller SC. The feed-direction signal VTD is to indicate whether the direction of tangential velocity is $+90°$ or $-90°$ with respect to the normal direction. Accordingly, the tangential-direction velocity signal $V_T$ assumes opposite polarities in the cases of the feed-direction signal VTD being "1" and "0".

The indexing circuit IND provides the displacement-direction signals $\sin\theta$ and $\cos\theta$ in the tracing plane, based on displacement signals of the two axial directions selected by the select signals AXS1 and AXS2 fed from the sequence controller SC. Now, assuming that the tracing takes place along the routes shown in FIGS. 4(A) and 4(B), the sequence controller SC: causes the select signal AXS2 to select the displacement signal $\epsilon_Z$ during tracing between the positions a and b, c and d, e and f, g and h, i and j, and k and l; selects the displacement signal $\epsilon_X$ between the positions b and c, d and e, f and g, h and i, and j and k; and causes the select signal AXS1 to select the displacement signal $\epsilon_Y$ between the positions a and l.

The switching circuit CC in the phase decision circuit PD selects either one of the displacement signals $\epsilon_X$ and $\epsilon_Y$, depending on a select signal AXS3, and applies the selected signal to the zero-cross circuit ZC. When the tracing is in planes parallel to the X-Z plane, the displacement signal $\epsilon_X$ is selected by the switching signal AXS3, and the displacement signal $\epsilon_X$ is provided to the zero-cross circuit ZC, whereas when the tracing is in planes parallel to the Y-Z planes, the displacement signal $\epsilon_Y$ is selected by the switching signal AXS3, and the displacement signal $\epsilon_Y$ is applied to the zero-cross circuit ZC. The zero-cross circuit ZC yields a phase decision signal PH indicating the polarity of the displacement signal $\epsilon_X$ or $\epsilon_Y$ applied via the switching circuit CC, and the phase decision signal is supplied to the sequence controller SC. Accordingly, when tracing occurrs along the routes shown in FIGS. 4(A) and 4(B), the phase decision circuit PD derives the phase decision signal PH indicative of the polarity of the displacement signal $\epsilon_Y$.

The sequence controller SC determines the feed-direction signal VTD as shown in Table 1, based on the phase decision signal PH from the phase decision circuit PD and a signal indicative of the direction of pick feed which is provided from the input unit IU, and the feed-direction signal is supplied to the velocity arithmetic circuit ART.

TABLE 1

| Direction Pick feed | Phase decision signal PH | Feed-direction signal VTD |
|---|---|---|
| + | − | "1" |
| − | + | "1" |
| + | + | "0" |
| − | − | "0" |

Furthermore, the sequence controller SC produces and outputs the select signals AXS1 and AXS2, the switching signal AXS3 and a gate signal SLT for controlling the gate circuit GC, based on a pick feed value and trace return position information from the input unit IU and the position signals from the position detectors PCX, PCY and PCZ. For instance, in the case of tracing along the routes shown in FIGS. 4(A) and 4(B), the sequence controller SC provides, during tracing between the positions a and b, c and d, e and f, g and h, i and j, and k and l, the select signal AXS1 for selecting the displacement signal $\epsilon_Y$, the select signal AXS2 for selecting the displacement signal $\epsilon_Z$ and the gate signal SLT for controlling the gate circuit GC so that a velocity command signal, which is produced in the distribution circuit DC based on the displacement-direction signals $\sin\theta$ and $\cos\theta$. Further, the normal-direction velocity signal $V_N$ and the tangential-direction velocity signal $V_T$ and applied to the amplifiers DRY and DRZ. Moreover, the sequence controller yields, during tracing between the positions b and c, d and e, f and g, h and i, and j and k, the select signal AXS1 for selecting the displacement signal $\epsilon_Y$, the select signal AXS2 for selecting the displacement signal $\epsilon_X$ and the gate signal SLT for controlling the gate circuit GC so that the velocity command signal from the distribution circuit DC is provided to the amplifiers DRX and DRY.

In the case shown in FIGS. 4A–B, the phase decision signal PH from the phase decision circuit PD varies as shown in Table 2.

TABLE 2

| Section | Phase decision Signal PH |
|---|---|
| b–c | − |
| d–e | + |
| f–g | − |
| h–i | + |
| j–k | − |

Further, in this case, since the direction of pick feed is +, the feed-direction signal VTD becomes such as shown in Table 3 as will be seen from Tables 1 and 2.

TABLE 3

| Section | Phase-direction Signal VTD |
|---|---|
| b–c | "1" |

TABLE 3-continued

| Section | Phase-direction Signal VTD |
|---|---|
| d–e | "0" |
| f–g | "1" |
| h–i | "0" |
| j–k | "1" |

Since the feed-direction signal VTD represents whether the direction of tangential velocity is selected to be +90° or −90° with respect to the normal direction as referred to previously, and since the polarity of the tangential-direction velocity signal $V_T$ from the velocity arithmetic circuit ARt is opposite in the cases of the feed-direction signal VTD being "0" and "1", respectively, tracing can be carried out along the route shown in FIGS. 4(A) and 4(B) by driving the motors MX, and MY and MZ with the outputs of the amplifiers DRX, DRY and DRZ selected by the gate circuit GC. Accordingly, in the case of tracing a hemispherical model, the pick feed plane corresponds to a contour trace and can be held in the X-Y plane.

As has been described in the foregoing, according to the present invention, the direction of pick feed is determined by a feed-direction signal produced based on the result of decision by a phase decision circuit and the direction of pick feed supplied from an input unit, and the pick feed is performed by a countour trace. Therefore, the present invention possesses the advantage that, also in the case of tracing a hemispherical model, the pick feed plane can be held in the X-Y plane.

We claim:

1. A tracer control system in which: a trace direction and a trace velocity are calculated, based on displacement signals from a tracer head tracing a model surface over a trace region; the tracer head performs tracing along a selected feed axis in each of a plurality of selected planes parallel to a selected one of the X-Z and Y-Z planes defined by respective X, Y and Z feed axes of said tracer control system; each time the tracer head has reached a boundary of the trace region, a pick feed is carried out along a respective selected one of said feed axes; and, upon completion of the pick feed, the tracer head proceeds to tracing along the respective selected feed axis in the subsequent one of said planes; said system comprising an input unit for inputting feed data, including data on the direction of the pick feed along the respective selected feed axis, a phase decision circuit for deciding the polarity of a respective one of said displacement signals from said tracer head corresponding to the selected feed axis along which said tracing is occurring, and a sequence controller for producing a feed-direction signal for controlling the pick feed, based on the result of the decision by the phase decision circuit and said data on the direction of the pick feed inputted from the input unit, wherein during each said pick feed, the tracer head performs tracing in a plane parallel to the X-Y plane, with the trace direction being determined from said feed-direction signal and the output of said phase decision circuit.

2. The system of claim 1, comprising
respective motors for moving said tracer head along each of said X, Y and Z axes, a gate circuit for controlling said motors for moving said tracer head, said gate circuit receiving a gate signal and other input signals;

a displacement calculation circuit and an adder for forming the difference between (1) a composite displacement signal derived from said displacement signals from said tracer head and (2) a predetermined displacement signal, a velocity arithmetic circuit for receiving said feed direction signal from said sequence controller and said difference from said displacement calculation circuit, and for outputting normal and tangential components of said trace velocity corresponding to the respective tracing plane, and including means for reversing the signal of the tangential velocity component depending on said feed direction signal, an indexing circuit having as inputs said displacement signals from said tracer head and first and second select signals for defining predetermined tracing planes, and providing as outputs displacement direction signals in the predetermined tracing plane, a distribution circuit having as inputs said normal and tangential velocity component signals from said velocity arithmetic circuit and said displacement direction signals from said indexing circuit, and providing as outputs said other input signals to said gate circuit, said phase decision circuit having as an input a third select signal, and said sequence controller outputting said first, second and third select signals, and said gate signal.

* * * * *